March 14, 1961 J. WHITE 2,975,065
METHOD FOR THE AERATION AND AGITATION OF LIQUORS
Filed Feb. 20, 1959 2 Sheets-Sheet 1
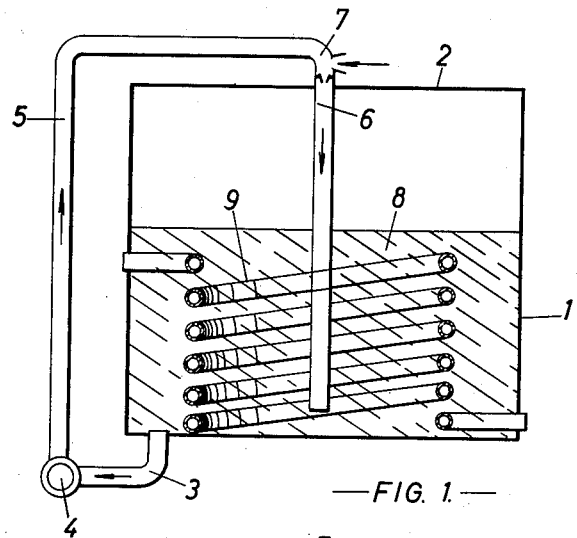
— FIG. 1. —
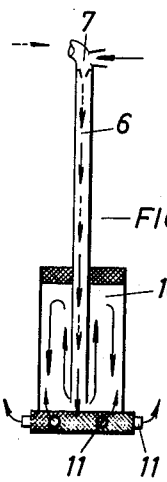
— FIG. 2. —
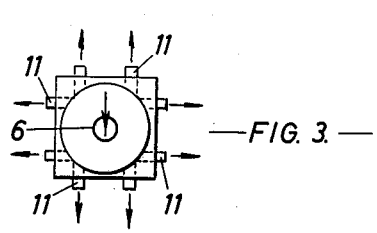
— FIG. 3. —
Inventor
John White
By
Mead, Browne, Schuyler & Beveridge
Attorneys

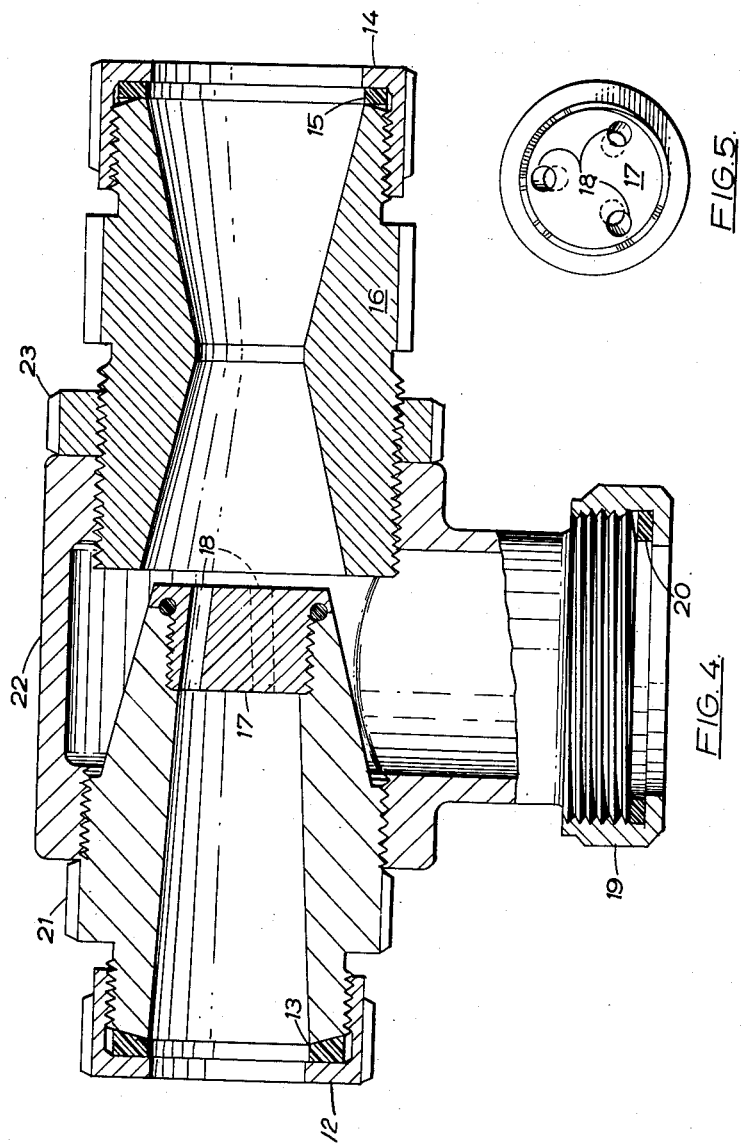

United States Patent Office 2,975,065
Patented Mar. 14, 1961

2,975,065

METHOD FOR THE AERATION AND AGITATION OF LIQUORS

John White, Edgbaston, Birmingham, England, assignor to Fardons' Vinegar Company Limited, Birmingham, England, a British company Filed Feb. 20, 1959, Ser. No. 794,632

Claims priority, application Great Britain Feb. 22, 1958

7 Claims. (Cl. 99—147)

This invention relates to a process and apparatus for the aeration and/or agitation of liquors.

Many processes are known which require a liquor to be agitated and many also are known in which aeration of a liquor is required, e.g. for bio-oxidation. In those processes in which a liquor is aerated it is frequently desirable or necessary for the aeration to be accompanied by agitation.

Among the liquors encountered commercially may be mentioned sewage and industrial effluent liquors especially gas works effluent. One of the problems of disposing of such liquors is that they are generally capable of absorbing oxygen and if discharged into rivers or similar water courses will cause damage to aquatic life. It is necessary, therefore, to subject them to some form of oxidation before such discharge. The present invention provides a suitable process for the oxidative treatment of such sewage and effluent liquors.

Even in cases where aeration is not necessary, many industrial liquors require agitation, e.g. to keep solids in suspension. The present invention provides a convenient process for effecting such agitation.

There are also many industrial biological processes which require liquors to be aerated, at least at some stage. Thus, in the brewing of beer in many breweries it is customary to aerate the wort at certain stages to provide sufficient oxygen for satisfactory yeast development and subsequent wort attenuation. In the aerobic fermentation of carbohydrates, such as sugar, for the manufacture of citric acid by means of Citromyces or Aspergillus, aeration is required. A certain amount of aeration is also required in the yeast fermentation stages in the preparation of whiskey, gin and other potable alcoholic liquors and in other alcohol-producing processes such as the production of industrial alcohol from fermentation of molasses by yeasts. Aerobic biological processes generally require some form of continuous aeration over substantial periods of time but even those biological processes which are not primarily aerobic often require aeration at some stage to stimulate the organism. A typical example is in the production of lactic acid by fermentation of sugar-containing liquors by lactic acid-forming bacteria of the *L. delbrückii* type. These bacteria are micro-aerophilic in nature but their production of lactic acid is stimulated by suitable aeration and agitation in the presence of finely divided calcium carbonate. The present invention is suitable for operations of this nature and, indeed, can suitably be employed in carrying out any such biological process where aeration and/or agitation is required.

One important industrial biological process in which aeration and agitation of a liquor is required, is the manufacture of vinegar. The present invention provides a process for such manufacture by the aeration of a fermentable liquor comprising an aqueous alcoholic solution containing acetifying organisms in suspension.

In the "Quick Vinegar Process" which is used in many vinegar breweries, the alcoholic liquor, which may be obtained from many sources but is generally obtained by the fermentation of fruits such as grapes or of malt, is trickled or sprayed over besoms or bundles of birch wood twigs in large vats, generally wooden vats, while at the same time air is passed over the besoms or bundles. These birch twigs assist in the growth of the vinegar bacteria and it is through the action of the bacteria that the alcohol is oxidised and acetic acid is formed.

It has been known for many years to employ a process of submerged fermentation for the production of baker's yeast and submerged fermentation has also been extensively employed in the manufacture of antibiotics such as penicillin.

In an article in Ullmann's Enzyklopaedie der technischen Chemie, 3rd edition, volume 6, at pages 773 to 775, entitled "Submerged Vinegar Fermentation Process," it is stated that O. Hromatka (Enzymologia, 1949, 13, 369; idem 1951, 15, 57; British Patent No. 686,849, in the name of Weinessigfabrik Anton Enenkel; and O. Hromatka, Chemiker Zeitung, 1952, 76, 776–815) succeeded for the first time in the realisation of submerged vinegar fermentation. It is stated that by this expression there is to be understood a fermentation process effected by means of acetic bacteria which multiply while immersed in a continuously aerated alcoholic liquor, are freely suspended without supporting material and convert the alcohol to acetic acid. It is made clear that a prerequisite for the success of submerged fermentation is that the aerobic bacteria are offered a sufficient concentration of dissolved oxygen in their immediate vicinity; and that, particularly with high acid concentration and non-optimum nutrition conditions, the bacteria are extremely sensitive to an interruption, even for seconds, of the air supply. It is stated that at the total concentration usual in the art of about 10%, a one minute interruption of aeration suffices completely to kill off the bacteria and even 15 seconds' interruption injures them considerably.

Large scale tests made by us have confirmed that when using a process and apparatus of the kind described in this article in Ullmann's Enzyklopaedie, the bacteria are, in fact, killed if the aeration is interrupted even momentarily. We have, however, found that by the process of the present invention, vinegar can be manufactured by a submerged fermentation process which does not suffer from this extreme sensitivity to interruption of the oxygen supply. In the process of the present invention for the manufacture of vinegar the aeration can be interrupted for periods of several minutes and can even be so interrupted several times each day without apparent detriment. It is simply necessary to resume the aeration and the fermentation will then proceed again.

The process of the present invention for the aeration and agitation of a liquor comprises continuously withdrawing said liquor from a vessel in which it is contained, dispersing gas in the liquor so withdrawn while causing it to flow downwardly through a confined space and continuously returning the liquor containing dispersed gas to the lower part of the vessel from which it was withdrawn.

Most suitably the liquor is withdrawn from a region at or near the bottom of the vessel and is returned to a region at or near the bottom of the vessel, but spaced from the first said region, through a downwardly extending pipe to an upper part of which the gas is fed in the direction of flow of such liquor.

The gas may be an oxygen-containing gas such as air and the liquor may be one which is undergoing aerobic fermentation. If the gas is air it may simply be drawn from the atmosphere and dispersed in the flowing liquor by causing the liquor to flow through an injector provided with the customary venturi-piece and nozzle. Such a nozzle may suitably have a plurality of jets arranged to give a swirling motion to the liquor.

The process of the invention for the manufacture of vinegar by the aeration of a fermentable liquor comprising an aqueous alcoholic solution containing acetifying organisms in suspension, comprises continuously withdrawing said fermentable liquor from a vessel in which it is contained, dispersing in the liquor so removed oxygen-containing gas while causing it to flow downwardly through a confined space and continuously returning the liquor containing dispersed oxygen-containing gas to the lower part of the vessel from which it was withdrawn.

In the manufacture of malt vinegar by the aeration of a fermentable liquor comprising malt wort, the process of the invention comprises continuously withdrawing said malt wort from a vessel in which it is contained, aerating the wort so removed by feeding into it oxygen-containing gas while causing it to flow downwardly through a confined space and continuously returning the wort so aerated to the lower part of the vessel from which it was withdrawn.

Preferably, said fermentable liquor is withdrawn from a region at or near the bottom of the vessel and is returned to a region at or near the bottom of the vessel, but spaced from said first region, through a downwardly extending pipe to an upper part of which the oxygen-containing gas is fed in the direction of flow of said liquor.

As already stated, the aeration may be interrupted if desired or necessary, and can for example be so interrupted for an interval of five minutes every eight hours.

The process may conveniently be operated in a semi-continuous manner by removing a proportion of the liquor when it contains not more than substantially 0.1% of alcohol and replacing it by fresh liquor. A suitable proportion to remove is substantially between one third and one half. Since the oxidation of the alcohol is an exothermic reaction, it is generally necessary for the highest efficiency of conversion of alcohol to acetic acid to provide cooling means in order to prevent the temperature of the liquor from rising unduly. For best results it is necessary to maintain the temperature at substantially 27° C., although satisfactory conversion is possible even at temperatures as high as 38° C. The invention also includes apparatus for carrying out the process, comprising a vessel adapted to contain such liquor, an outlet pipe at or near the bottom of the vessel and, connected to said outlet pipe through means including a pump or like liquid impeller, an inlet pipe extending downwardly and almost to the bottom of said vessel and means for feeding air into the upper part of such inlet pipe.

The means for feeding air into the upper part of the inlet pipe preferably comprise an injector, most suitably one with a venturi-type nozzle having a plurality of holes to apply a swirling motion to the flowing liquid and thus enable an intimate fluid-gas mixture to be formed. The apparatus preferably includes coils within the vessel through which cooling liquid may be caused to flow, but other means of cooling, e.g. cooling in an external cooling device such as a paraflow or other apparatus, may be provided.

The lower end of the inlet tube may, if desired, terminate in a baffling device to facilitate the mixing of the liquid being returned to the vessel with that already in the vessel.

A preferred form of apparatus of the invention which is suitable for use in the manufacture of malt vinegar will now be described with reference to the accompanying diagrammatic drawing, in which:

Figure 1 is a vertical cross-section of a suitable apparatus,

Figure 2 is a cross-sectional view of an alternative arrangement of the inlet pipe shown in Figure 1, Figure 3 is a plan view of the baffling device shown in Figure 2, Figure 4 is a section on a larger scale through the venturi-type nozzle, and Figure 5 is a front view of the apertured plate in the venturi-type nozzle.

As shown in the drawing, the vessel 1 which may be of wood or an acid-resistant metal such as stainless steel, is provided with a cover 2 which is either a loose fit or is provided with apertures for the escape of air or other gas, in which case provision may be made for suitable condensing arrangements to prevent escape of valuable volatile substances, e.g. ethyl alcohol and acetic acid or volatile intermediates formed when the apparatus is used for the manufacture of malt vinegar.

An outlet pipe 3 leads to a pumping device 4 by which the liquor is circulated from vessel 1 through upflowing pipe 5 into downflowing pipe 6. The pumping device 4 may consist of a single rotary pump or two or more rotary pumps in tandem. At the point 7 in pipe 6 there is provided an injector 7 by which air is drawn from the atmosphere into the liquid flowing down pipe 6. The liquid flowing down pipe 6 is undergoing aeration by means of the air introduced at 7 and flows into the lower part of the body of the liquor 8 in the vessel 1. Cooling coils 9 are provided to enable the temperature to be maintained at the desired value, most suitably at substantially 27° C.

As shown in Figure 2, the downflowing pipe 6 may terminate in a closed box-like member 10 provided with eight outlets 11.

As shown in Figure 4 of the drawing, the injector 7 is connected to pipe 5 by nut 12 and inlet joint ring 13 and to pipe 6 by nut 14 and outlet joint ring 15. The liquid is fed to the venturi-piece 16 through a nozzle formed by providing a plate 17 with three holes 18 which are inwardly directed to the throat of the venturi-piece 16. More than three such holes 18 may be provided, if desired. A plate 17 with six such holes can be used with advantage. An air inlet pipe (not shown) is connected by nut 19 and air inlet joint ring 20. The inlet member 21 is connected to the venturi-piece 16 by a threaded body member 22 and a lock nut 23 is provided to enable the perforated plate 17 to be spaced from the throat of the venturi-piece 16 at the most suitable distance.

It is preferred to provide two or more separate outlet pipes 3, each having a pumping device 4 and each connected to a separate inlet pipe 5 provided with an injector 7 and leading to a separate downflowing pipe 6 in the vessel 1.

By way of example, when the apparatus described with reference to the drawing was used for the manufacture of malt vinegar, the vessel 1 was frusto-conical, was 19 feet deep and had a top diameter of 10 feet 6 inches and a bottom diameter of 12 feet. It held approximately 12,000 gallons and when filled to a depth of 13 feet with malt wort contained approximately 8,100 gallons. Two pumping devices 4, each consisting of three rotary pumps in series, circulated the liquor at 100 lb./sq. inch pressure at the rate of approximately 5000 gallons per hour each through two separate injectors 7 in two separate inlet pipes 5 each feeding into the wort approximately 15 cubic feet of air per minute.

The pumping device 4 and injector 7 may, if desired, be chosen to give a much greater rate of airflow, but the figure given is suitable for vinegar production where it is desirable to prevent undue loss of volatile products from the reaction vessel.

The malt wort initially contained about 6.0% v./v. of alcohol and after it had been aerated for 4 days, the amount of alcohol remaining was less than 0.1%. At this stage approximately 3700 gallons of liquor were withdrawn and replaced by an equal amount of fresh malt wort. The aeration was then continued. The liquor removed was matured in the usual way over beech chippings and then filtered. Every 4 days thereafter approximately 3700 gallons of liquor were withdrawn and matured and were replaced by an equal amount of fresh malt wort and the aeration continued.

A continuous fermentation was carried out in an apparatus similar to that used in the process just described, employing a vessel 1 having a capacity of 12,000 gallons. About 8100 gallons of malt wort having an alcohol content of 6.0% v./v. was circulated in the same manner by the two pumping devices 4 each delivering approximately 5000 gallons per hour through the two injectors 7 each of which dispersed approximately 15 cubic feet of air per minute in the liquor. This circulation and aeration of the liquor was continued until the alcohol content had decreased to 0.1% v./v. Then, while the circulation and aeration were continued, fresh alcoholic malt wort was run in at a steady rate to maintain the alcohol content at 0.1% v./v. and a corresponding amount of liquor was allowed to overflow. It was found that a steady feed of 50 gallons per hour sufficed to keep the alcohol content at 0.1% v./v. In this way 1200 gallons per day of vinegar containing 6% acetic acid were produced each day of 24 hours. One advantage of the continuous process is that it avoids the necessity of providing an induction period. Oxidation is slow at first when a fresh batch of malt wort is being oxidized. In the example first given above, it was necessary to carry out oxidation for 4 days before any liquor was withdrawn for maturing.

In the application of the invention to the stimulation by aeration of the yeast growth and fermentative activity with consequent alcohol production and vigorous rate of wort attenuation of a malt brew, the brew may have an initial specific gravity of 1.080 which is required to be reduced to 1.005 or less. The customary method of attenuation requires 5 days. By the aid of the present invention using one pump and one injector, this time can be reduced to 2½ to 3 days. With a brew of 1000 gallons, this can be done by circulation and aeration of the liquor for 1 minute at the start of the brew, after the addition of the yeast, and for 10 seconds every 6 hours.

It will be apparent that the invention overcomes many disadvantages of the customary methods used for aeration of alcoholic malt wort for vinegar manufacture or malt brews for the manufacture of baker's yeast. No air compressors or air delivery lines or air distributors are necessary. Cleaning and sterilization of the equipment can be very easily carried out. Moreover, the apparatus readily lends itself to modification in detail to render it suitable for the agitation and/or aeration of any particular liquid.

I claim:

1. Process for the aeration and agitation of a liquor which comprises holding a body of said liquor, continuously withdrawing liquor from said body and causing said liquor withdrawn to flow downwardly whilst confining it, continuously feeding oxygen-containing gas into said liquor withdrawn whilst it is flowing downwardly, causing the liquor having oxygen-containing gas so dispersed therein to continue flowing downwardly in an elongated path whilst still confined and continuously returning the liquor into which said oxygen-containing gas has been fed to the lower part of said body of liquor.

2. Process for the aeration and agitation of a liquor undergoing aerobic fermentation which comprises holding a body of liquor containing aerobic organisms in suspension, continuously withdrawing liquor from said body and causing said liquor withdrawn to flow downwardly whilst confining it, continuously feeding oxygen-containing gas into said liquor withdrawn whilst it is flowing downwardly, causing the liquor having oxygen-containing gas so dispersed therein to continue flowing downwardly in an elongated path whilst still confined and continuously returning the liquor into which said oxygen-containing gas has been fed into the lower part of said body of liquor.

3. Process for the manufacture of vinegar by the aerobic fermentation of a fermentable liquor comprising an aqueous alcoholic solution containing acetifying organisms in suspension which includes the steps of holding a body of said liquor undergoing fermentation, continuously withdrawing liquor from said body, causing said liquor withdrawn to flow downwardly whilst confining it, continuously dispersing oxygen-containing gas in said liquor withdrawn whilst it is flowing downwardly, causing the liquor having oxygen-containing gas so dispersed therein to continue flowing downwardly in an elongated path whilst still confined and continuously returning the resulting liquor containing dispersed gas to the lower part of said body of liquor.

4. Process for the manufacture of malt vinegar by the aerobic fermentation of malt wort which comprises holding a body of liquor consisting of malt wort undergoing fermentation, continuously withdrawing liquor from said body, causing said liquor withdrawn to flow downwardly whilst confining it, continuously feeding oxygen-containing gas into said liquor withdrawn whilst it is flowing downwardly, causing the liquor having oxygen-containing gas so dispersed therein to continue flowing downwardly in an elongated path whilst still confined and continuously returning said liquor into which said oxygen-containing gas has been fed to the lower part of said body of liquor.

5. Process for the manufacture of vinegar by the aerobic fermentation of a fermentable liquor comprising an aqueous alcoholic solution containing acetifying organisms in suspension which includes the steps of holding a body of liquor consisting of fresh fermentable liquor and fermented liquor, continuously withdrawing liquor from a lower part of said body, causing said liquor withdrawn to flow downwardly whilst confining it, continuously dispersing oxygen-containing gas in said liquor withdrawn whilst it is flowing downwardly, causing the liquor having oxygen-containing gas so dispersed therein to continue flowing downwardly in an elongated path whilst still confined, continuously returning the resulting liquor containing dispersed gas to the lower part of said body of liquor at a place spaced from that from which liquor is being continuously withdrawn, continuously removing liquor from an upper part of said body and continuously replacing liquor so removed by fresh fermentable liquor.

6. Process for the manufacture of malt vinegar by the aerobic fermentation of malt wort which comprises holding a body of liquor consisting of fresh malt wort and fermented malt wort, continuously withdrawing liquor from a lower part of said body, causing said liquor so withdrawn to flow downwardly whilst confining it, continuously feeding oxygen-containing gas into said liquor withdrawn whilst it is flowing downwardly, causing the liquor having oxygen-containing gas so dispersed therein to continue flowing downwardly in an elongated path whilst still confined, continuously returning said liquor into which said oxygen-containing gas has been fed to the lower part of said body at a place spaced from that from which said liquor is being continuously withdrawn, continuously removing liquor from an upper part of said body and continuously replacing liquor so removed by fresh malt wort.

7. Process for the manufacture of malt vinegar by the aerobic fermentation of malt wort which comprises holding a body of liquor consisting of a mixture of fresh malt wort having an alcohol content of about 6.0% v./v. and fermented malt wort, said body of liquor having an alcohol content of about 0.1% v./v., withdrawing continuously at least one-half of the volume per hour of said liquor from a lower part of said body, causing said liquor so withdrawn to flow downwardly whilst confining it, continuously feeding oxygen-containing gas into said liquor withdrawn whilst it is flowing downwardly, causing the liquor having oxygen-containing gas so dispersed therein to continue flowing downwardly in an elongated path whilst still confined, continuously returning said liquor into which said oxygen-containing gas has been fed to the lower part of said body at a place spaced from that from which said liquor is being continuously withdrawn, continuously removing not more than one two-hundredths of the volume per hour of said liquor from an upper part of said body and continuously replacing liquor so removed by fresh malt wort having an alcohol content of about 6.0% v./v.

References Cited in the file of this patent

UNITED STATES PATENTS

| | | |
|---|---|---|
| 1,732,921 | Bratton | Oct. 22, 1929 |
| 1,880,381 | Frings | Oct. 4, 1932 |
| 2,281,457 | Rosenqvist | Apr. 28, 1942 |
| 2,707,683 | Hromatka | May 3, 1955 |
| 2,750,328 | Stimpson et al. | June 12, 1956 |
| 2,913,343 | Richardson | Nov. 17, 1959 |